(12) United States Patent
Raghavan et al.

(10) Patent No.: US 10,819,409 B2
(45) Date of Patent: Oct. 27, 2020

(54) HANDLING DYNAMIC BLOCKAGE IN MILLIMETER WAVE COMMUNICATION SYSTEMS

(71) Applicant: QUALCOMM Incorporated, San Diego, CA (US)

(72) Inventors: Vasanthan Raghavan, West Windsor Township, NJ (US); Kobi Ravid, Closter, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/297,536

(22) Filed: Mar. 8, 2019

(65) Prior Publication Data

US 2019/0341986 A1 Nov. 7, 2019

Related U.S. Application Data

(60) Provisional application No. 62/666,628, filed on May 3, 2018.

(51) Int. Cl.
*H04B 7/06* (2006.01)
*H04B 7/0426* (2017.01)
(Continued)

(52) U.S. Cl.
CPC .......... *H04B 7/0617* (2013.01); *H04B 7/043* (2013.01); *H04B 7/15514* (2013.01); *H04B 17/327* (2015.01); *H04B 17/336* (2015.01)

(58) Field of Classification Search
CPC .. H04B 7/0617; H04B 17/327; H04B 17/336; H04B 7/043; H04B 7/0452; H04B 7/0695; H04W 16/28
(Continued)

(56) References Cited

U.S. PATENT DOCUMENTS

2011/0228749 A1\* 9/2011 Taghavi Nasrabadi ...................... H04L 12/5692
370/338
2018/0049154 A1 2/2018 Choi et al.
(Continued)

FOREIGN PATENT DOCUMENTS

WO 2016173669 A1 11/2016

OTHER PUBLICATIONS

International Search Report and Written Opinion—PCT/US2019/021656—ISA/EPO—dated Dec. 2, 2019.
(Continued)

*Primary Examiner* — Leila Malek
(74) *Attorney, Agent, or Firm* — Arent Fox LLP

(57) ABSTRACT

Aspects are provided which handle dynamic blockage of beams transmitted by a base station to UEs in millimeter wave communication. In one aspect, the base station identifies at least two UEs with which the base station has established a link and which may be potentially blocked from the base station by a dynamic blocker such as a moving vehicle. After the potentially blocked UEs are identified, the base station schedules all identified UEs for joint beam training and receives feedback transmitted by the UEs to determine if a dynamically blocked spatial region exists. If a blockage exists, the base station performs a follow-up procedure to avoid the dynamically blocked spatial region and provide coverage for the UEs, for example, by blanking out or not using blocked beams in subsequent beam training and/or by coordinating with a neighbor cell. The base station may thus proactively improve coverage of dynamically blocked UEs.

30 Claims, 13 Drawing Sheets

(51) Int. Cl.
*H04B 17/336* (2015.01)
*H04B 17/327* (2015.01)
*H04B 7/155* (2006.01)

(58) Field of Classification Search
USPC ........................................................ 375/262
See application file for complete search history.

(56) References Cited

U.S. PATENT DOCUMENTS

2018/0159607 A1* 6/2018 Rybakowski ........ H04B 7/0617
2018/0198504 A1* 7/2018 Li ........................ H04B 7/0695
2018/0332492 A1* 11/2018 Wang .................... H04W 24/10
2019/0386734 A1* 12/2019 Nilsson ................ H04B 7/0404

OTHER PUBLICATIONS

Partial International Search Report—PCT/US2019/021656—ISA/EPO—dated Sep. 25, 2019.

* cited by examiner

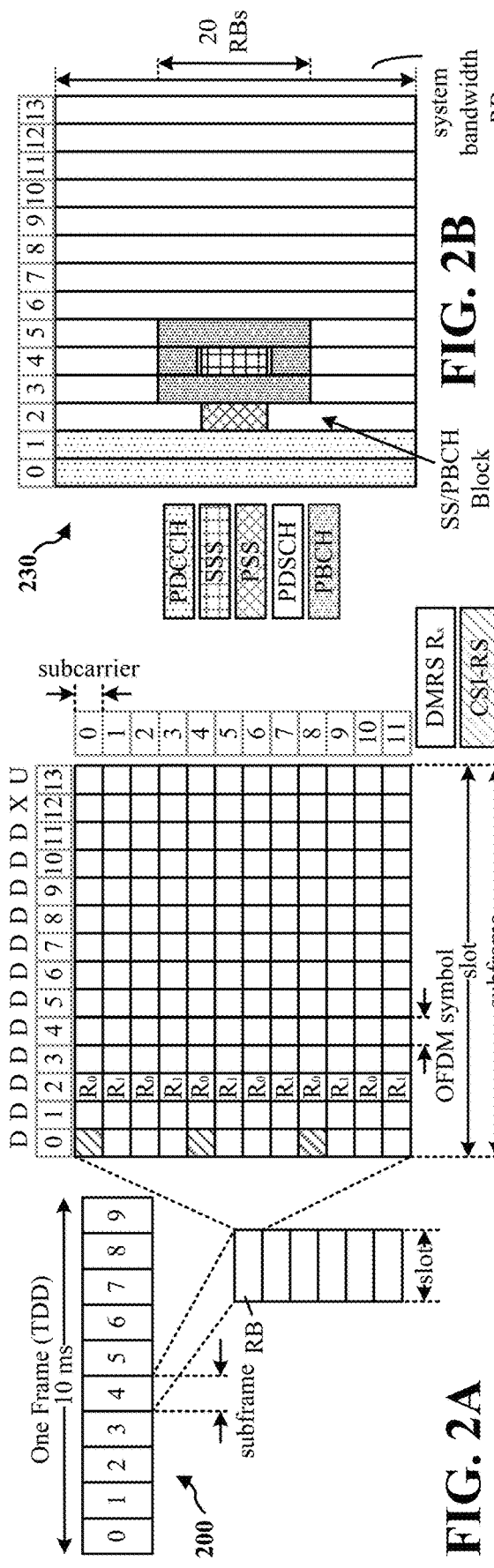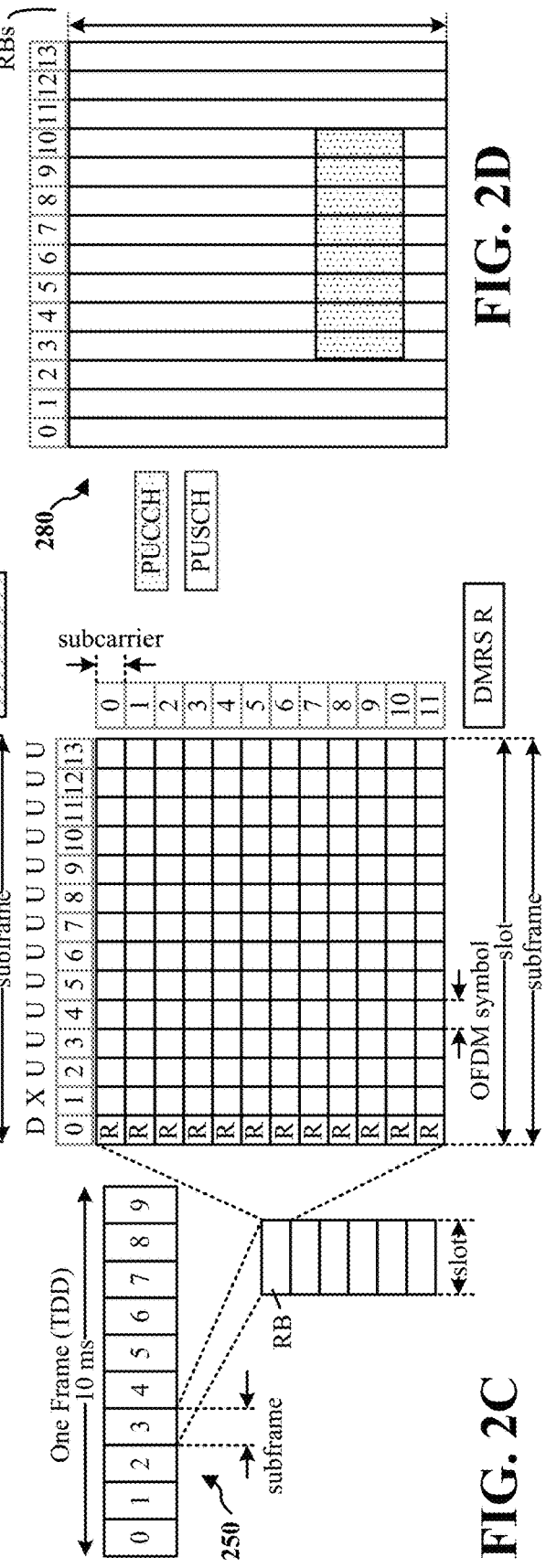

HANDLING DYNAMIC BLOCKAGE IN MILLIMETER WAVE COMMUNICATION SYSTEMS

CROSS REFERENCE TO RELATED APPLICATION(S)

This application claims the benefit of U.S. Provisional Application Ser. No. 62/666,628, entitled "HANDLING DYNAMIC BLOCKAGE IN MILLIMETER WAVE COMMUNICATION SYSTEMS" and filed on May 3, 2018, which is expressly incorporated by reference herein in its entirety.

BACKGROUND

Technical Field

The present disclosure relates generally to communication systems, and more particularly, to a millimeter wave (mmW) communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus establishes a link with a plurality of UEs served by the base station. The apparatus then identifies at least two UEs from among the plurality of UEs for joint beam training, wherein the identification is based on a potential block of at least one serving beam for the at least two UEs. The UE performs the joint beam training for the at least two UEs.

The UEs may be identified, for example, based on past beam index information and corresponding signal strengths received from the plurality of UEs served by the base station, such as based on a correlated deterioration of past signal strengths for the at least two UEs over time. The base station may use feedback from the UEs for the joint beam training to determine a dynamically blocked spatial region and may perform a follow up procedure to avoid the dynamically blocked spatial region and provide coverage for the UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
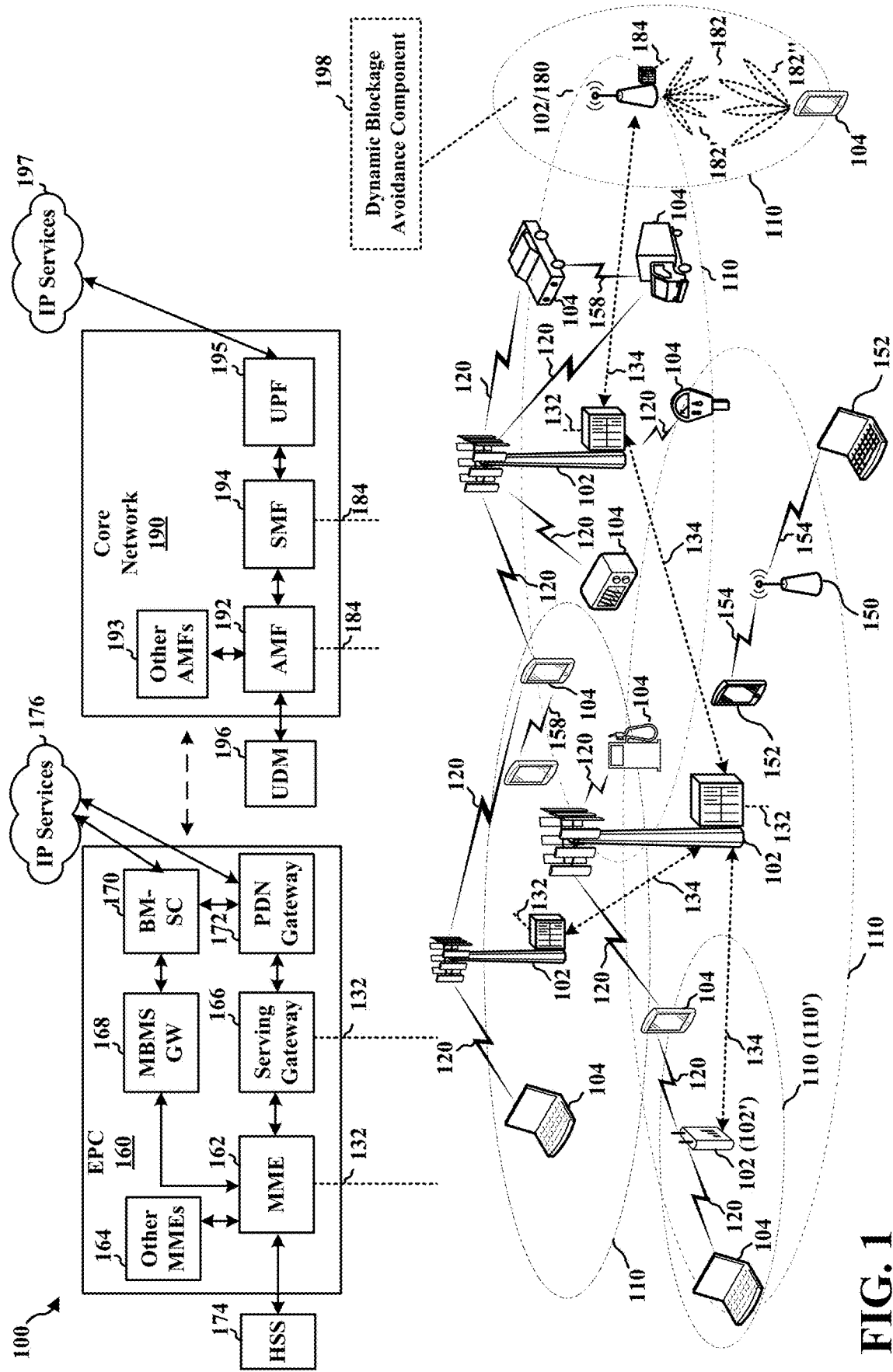
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may include a dynamic blockage avoidance component 198 which is configured to perform joint beam training for multiple UEs sharing potentially blocked beam(s)/angle(s)/direction(s)/region, as well as follow up procedures as described in connection with the following figures to avoid or otherwise handle the dynamically blocked beam(s)/angle(s)/direction(s)/region in mmW systems. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
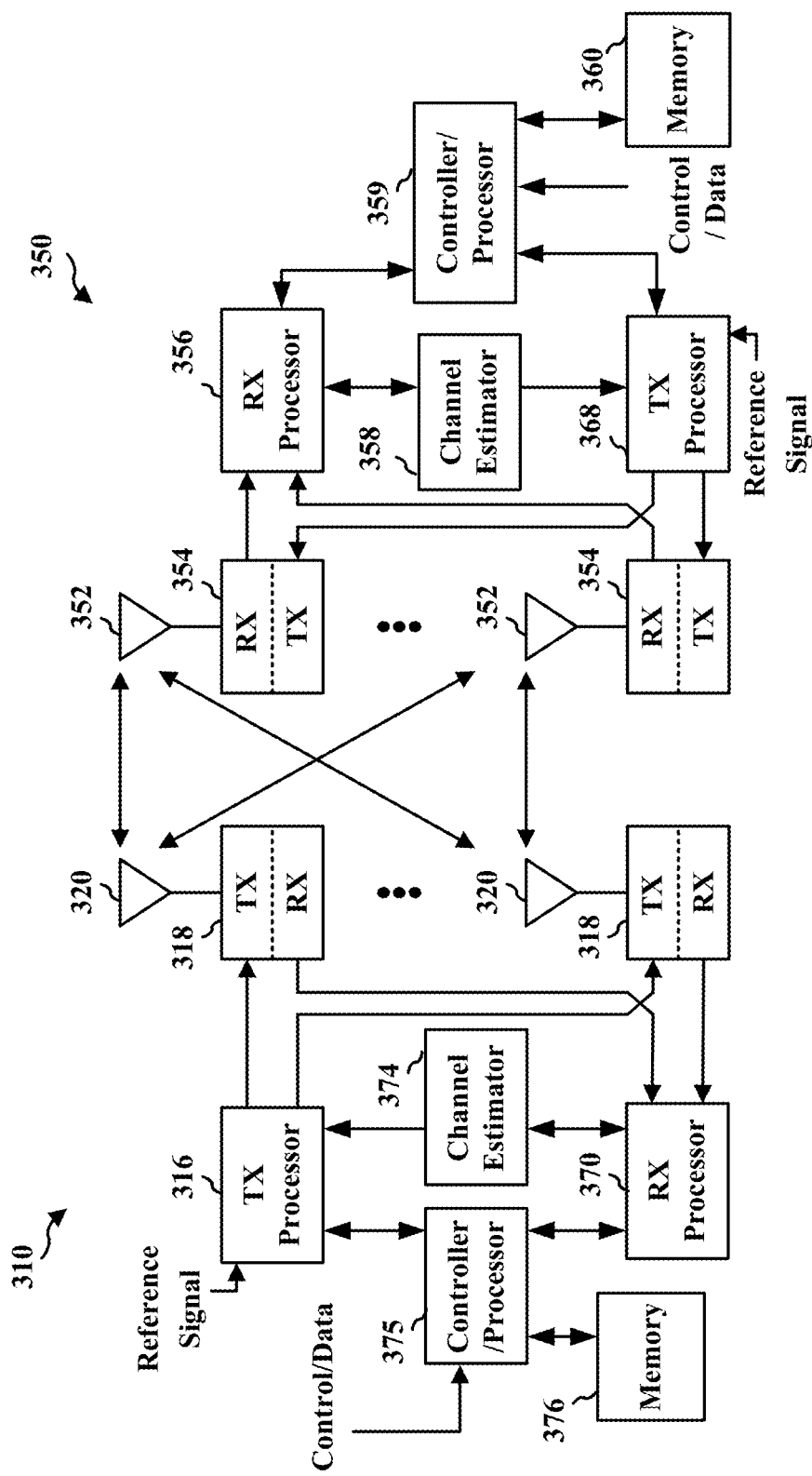
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with dynamic blockage avoidance component 198 of FIG. 1.

Figure 4:
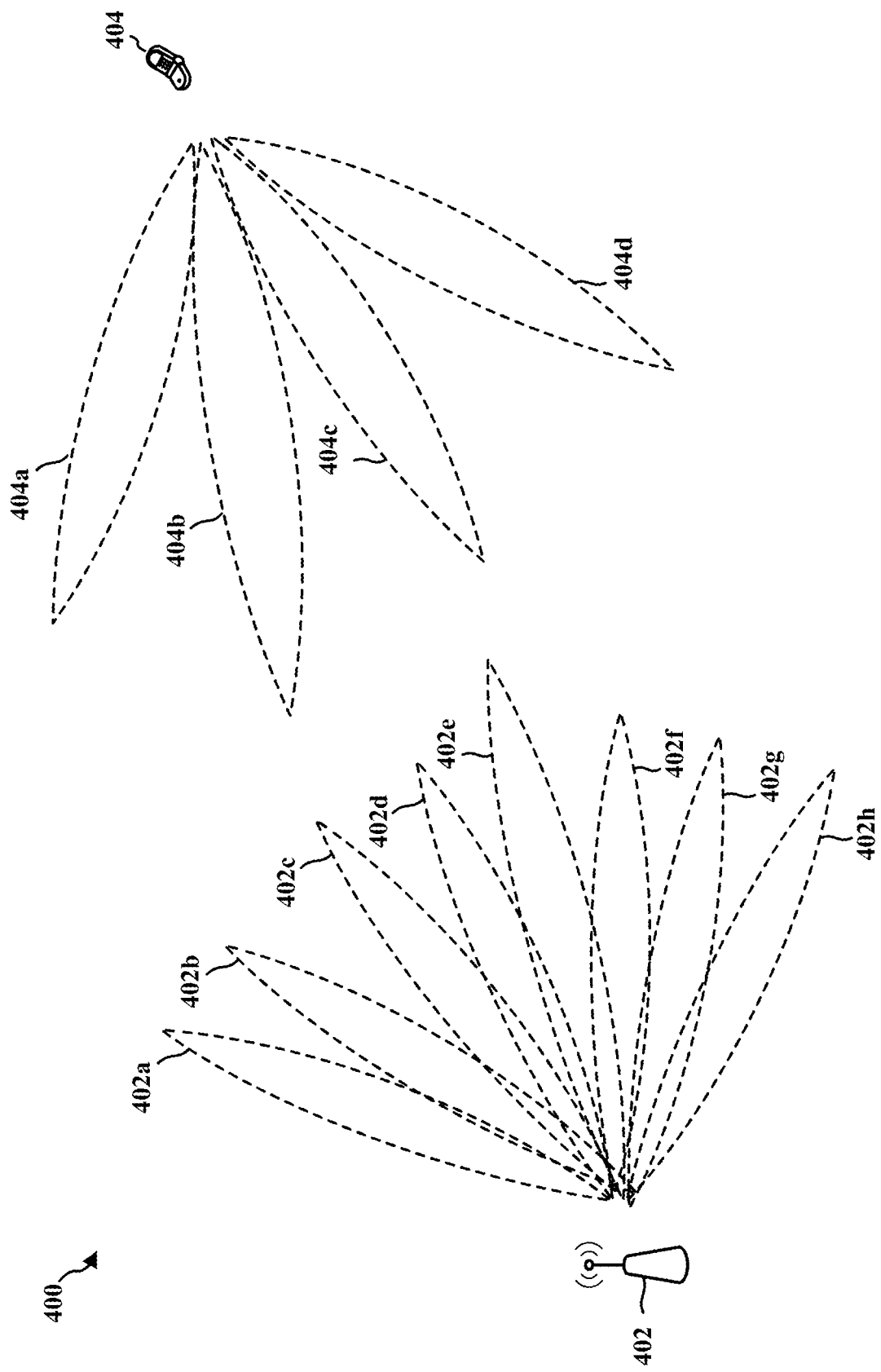
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same. Beamforming may be used to reduce, e.g., a downlink budget.

The UE 404 and base station 402 may perform initial synchronization and discovery to establish a communication link, e.g., along a path/cluster using at least one of the beam directions described in connection with FIG. 4. The base station and UE may perform a beam scanning procedure, which may include different stages. In a first stage (e.g., a P-1 stage), the UE and base station may perform an initial beam acquisition in which the devices scan over each of the beam directions to ascertain a quality measurement associated with each of the beam directions. The initial beam acquisition may be based on SS blocks. In the second and third stages (e.g., P-2 and P-3 stages), after performing the initial synchronization and discovery, the UE and base station may perform beam refinement to further refine the beam information. A second stage (P-2) may include the base station scanning through at least a subset of refined beam directions to perform a beam refinement. A third stage (P-3) may include the UE scanning through at least a subset of refined beam directions to perform a beam refinement. In a synchronization signal (SS) based transmission design, e.g., as in NR, each UE may provide feedback of a set of top-K analog/RF beam indices along with an associated beam quality information for the beam associated with the respective beam indices. The top-K beam indices may indicate a number, K, of beams that are being reported to the base station, e.g., beams having the best beam quality for communication between the base station and the UE. The beam quality information may include Reference Signal Received Power (RSRP), CQI, PMI, and/or RI for the respective beams.

Figure 5:
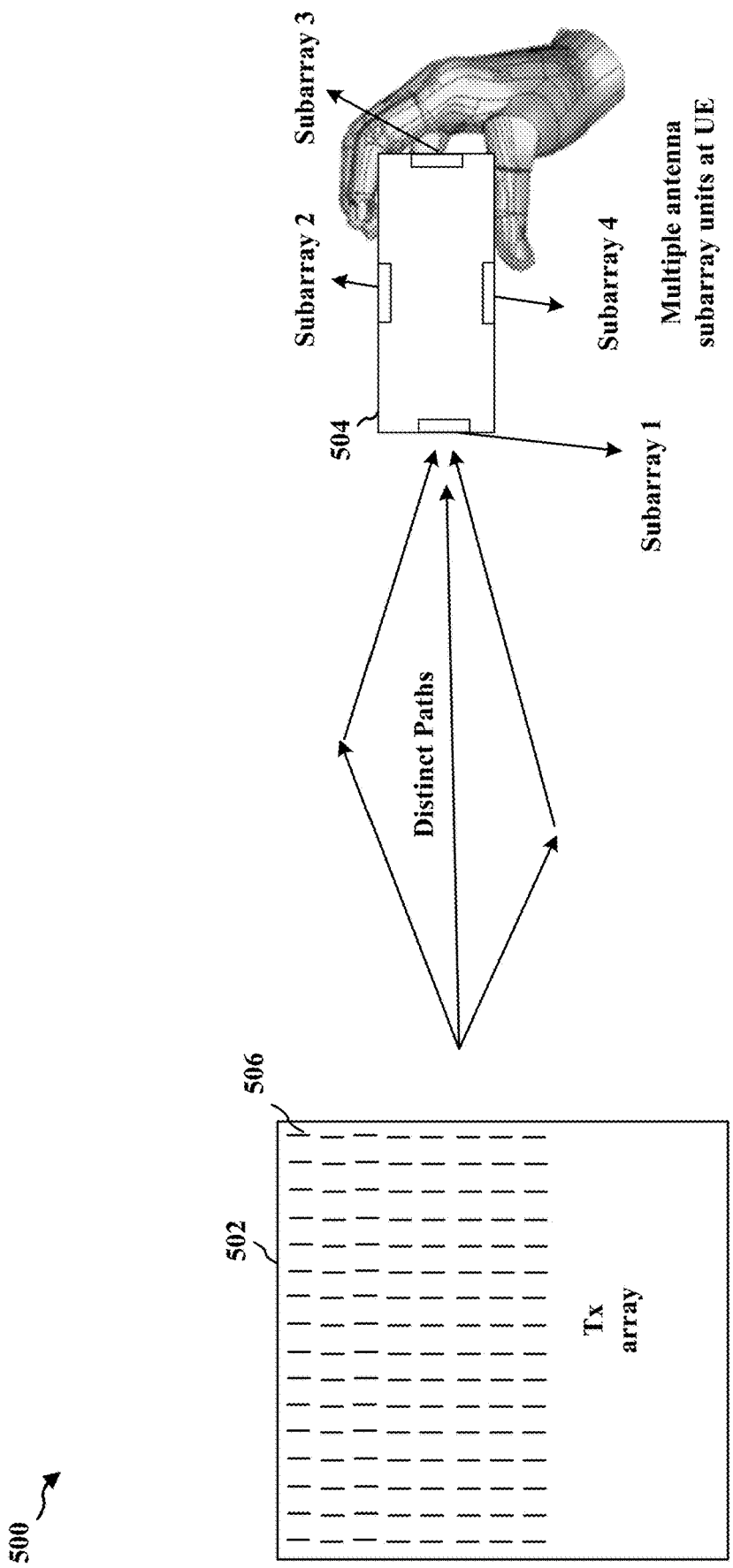
FIG. 5 illustrates a base station having an antenna array in communication with a UE having multiple antenna subarrays.

In order to transmit and receive communication using different beams, multiple antennas may be used at the base station and at the UE. FIG. 5 illustrates an example 500 of beamformed communication between an antenna array 502 at a base station and antenna subarrays at a UE 504. The antenna array 502 at the base station may comprise more antennas 506 than the subarrays at the UE 504. For example, the antenna array 502 of the base station is illustrated as having a 16×8 antenna array whereas each antenna subarray of UE 504 may have fewer antennas such as a 4×1 array 8×2 array, or the like. Thus, the beamwidth for downlink communication from the base station may be narrower than the beamwidth for uplink communication from the UE.

At times, the beams used for communication from the base station and the UE may become blocked. For example, a moving person or vehicle may be temporarily positioned in the path of the beam, limiting the energy received by the UE or base station over the beam. An item blocking a beam path may be referred to herein as a blocker. A blocker may be static or dynamic. For example, a building, pillar, or other static structure may block a beam between a base station and a UE, e.g., as the UE moves relative to the stationary feature(s). In mmW communication, the static structure may block the signal over the beam from a base station until the UE moves to a new position. Beam blockage may also include dynamic blockage due to moving items, such as vehicles, people, etc. that temporarily move into positions between the UE, the base station and the cluster(s) which help in communications.

Blocked communication paths between a UE and base station may be a more serious issue for mmW communication than for other types of communication, e.g., sub-6 GHz carrier frequency communication. In mmW communication, a channel has a clustered structure, e.g., the channel is a superposition of a number of clusters over which communication is possible. The blockage may occur at the base station side or at the UE side. At the UE side, a body part, e.g., hand, shoulder, face, etc., or another person may block an antenna subarray. For example, FIG. 5 illustrates antenna subarray 3 being blocked by a person's hand. In order to address UE side blockage, the UE antenna design may be configured to provide robust spherical coverage. For example, FIG. 5 illustrates antenna subarrays configured to transmit in multiple directions surrounding the UE. The UE may use beam training to inform the base station of alternate, good paths from the serving base station and from neighbor base stations. A UE may switch to a different subarray that is not blocked in order to continue communication. For example, the UE may fallback to an alternate, good second path when a first path is blocked. A UE may also perform fallback to a different type of communication than mmW communication in response to the blocked antenna subarray, e.g., fallback to LTE or sub-6 GHz communication for a control and/or data channel. In another example, the UE may transmit and/or receive with a beam in multiple directions, creating a multi-beam transmission.

However, it may be helpful to also address base station side blockage of beams. The beams at the base station may be narrower than those from the UE. In contrast to sub-6 GHz base stations and/or LTE base stations, a base station for mmW communication may cover a smaller cell or area and may be placed at lower heights. For example, a mmW base station may be positioned on a lamp fixture, a traffic light, etc. Additionally, a mmW base station may be mobile, e.g., placed on a drone, blimp, or stadium overhang for special events' coverage. Such mobile base stations may also be placed on mobile vehicles, such as buses, trains, etc. With these lower heights and mobility, beams from mmW base stations may be dynamically obstructed by vehicles, moving people, buildings, and/or other structures. Such obstruction places dynamic limits on the coverage area of the mmW base station. The base station side blockage may be semi-static and may last for a longer duration than UE side blockage. For example, base station side blockage may last for minutes or even longer (e.g., a parked utility vehicle that blocks certain coverage regions for a long time, etc.).

The present disclosure provides aspects that address the challenges of dynamic blockage of beams transmitted by a base station to UEs, e.g., in mmW communication. A base station may identify at least two UEs with which the base station has established a link and which may be potentially blocked from the base station by a dynamic blocker (e.g. a moving vehicle). The identification of these UEs may be based on past beam index information (e.g. corresponding to the previous beam(s) transmitted to or received from a UE) with commonly or correlatedly deteriorated signal strengths (e.g. RSRP) in a certain set of direction(s)/angle(s)/region over time. More details regarding this identification procedure are described below with respect to FIGS. 6 and 8. After the potentially blocked UEs are identified, the base station may schedule the identified UEs for joint beam training (e.g. by sending training symbol(s) over the potentially blocked beams) and receives feedback transmitted by the UEs (e.g. RSRPs) to determine if a dynamically blocked spatial region exists. If a blockage exists, the base station may perform a follow-up procedure to avoid the dynamically blocked spatial region and provide coverage for the UEs, for example, by blanking out or not using blocked beams in subsequent beam training and/or by coordinating with a neighbor cell as described below with respect to FIG. 9. Thus, the follow-up procedure may serve as an alternative to simple beam refinement, which might not avoid the dynamic blocker in mmW communications as described below with respect to FIG. 10. The base station may proactively improve coverage of dynamically blocked UEs. An example call flow diagram describing this entire process is illustrated and discussed with respect to FIG. 7 below.

As described supra, as part of a beam scanning procedure, the UE may feedback a beam index and corresponding beam quality information to the base station. The base station may receive such information in a periodic manner, e.g., every 200 ms. At the base station, each beam index can be mapped to a specific collection of angles or directions. The base station may accumulate the feedback information from the UEs that it services. The base station may evaluate the evolution of the feedback information over time in order to make an inference regarding potentially blocked angle(s)/direction(s).

Figure 6:
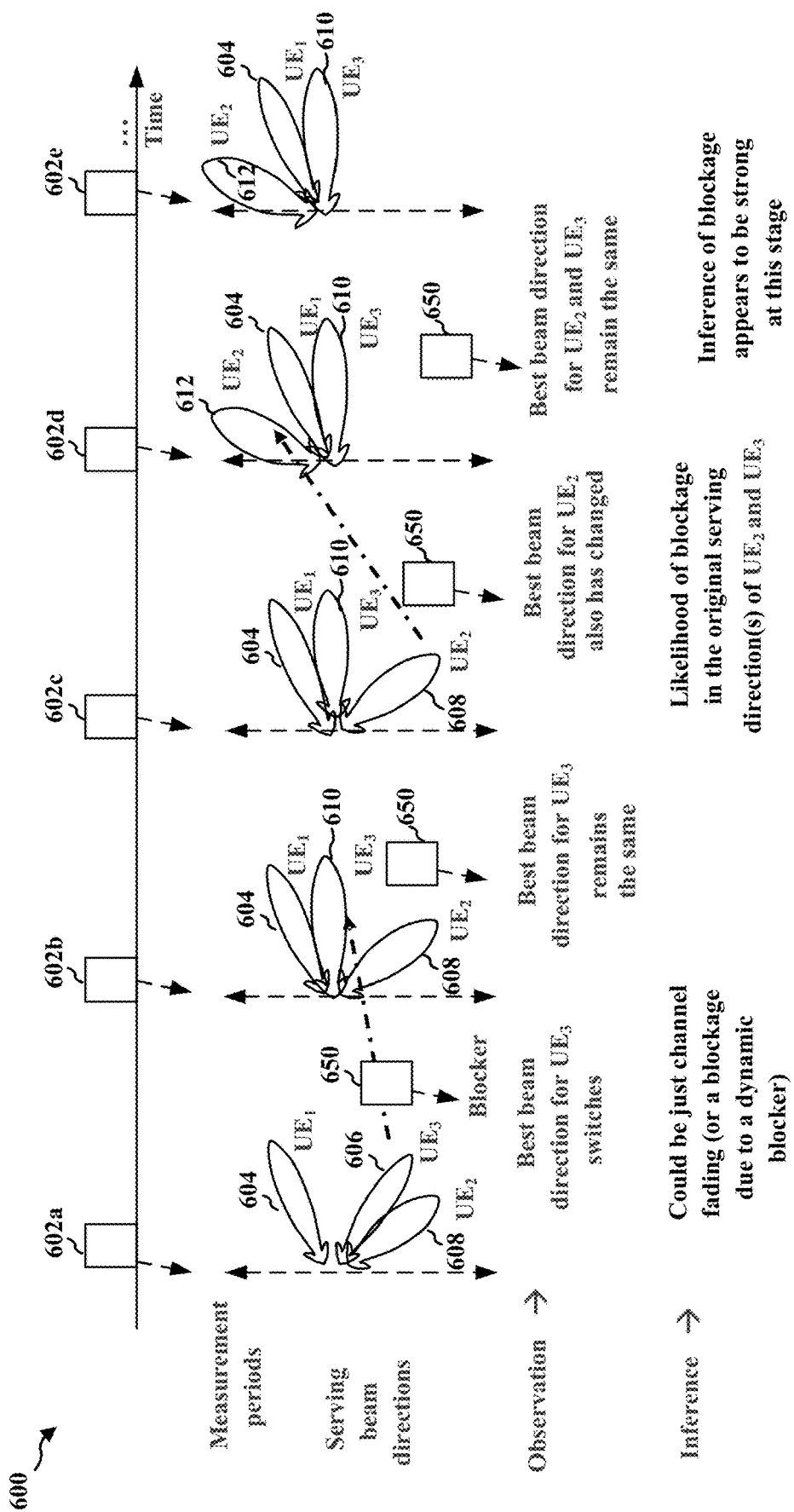
FIG. 6 illustrates an observation of serving beam directions for multiple UEs over multiple measurement periods.

FIG. 6 illustrates an example 600 of accumulated feedback information for different measurement periods that enable the base station to infer possible blockage of a beam direction. In a first measurement period 602*a*, a base station (e.g., 102, 180, 310, 402, 502, etc.) may communicate with three UEs, e.g., UE1, UE2, UE3, using three different serving beams, e.g., beams 604, 606, 608.

At the following measurement period 602*b*, the base station may receive a beam change request from UE3 to switch from beam 606 to beam 610. While the base station observes the request for a beam change from UE3, the beam change request may be due to signal deterioration corresponding to either fading or blockage, e.g., blockage caused by a dynamic blocker. While the change request may be due to blocker 650 blocking the beam path, the base station may not be able to infer the reason for the request for the beam change (e.g. that the change request is indeed due to blocker 650 rather than fading) without additional information.

In measurement period 602*c*, the base station observes that UE3 has not requested a further beam change and remains at beam 610. This lack of an additional beam switch request from $UE_3$ possibly indicates that the prior beam switch was likely not due to fading. Nevertheless, such an inference may not be conclusive at this stage based on information from only $UE_3$.

In measurement period 602*d*, $UE_2$ also indicates a need for a beam change from beam 608 to beam 612. Beam 608 for $UE_2$ was spatially close, e.g., in terms of angle covered, to beam 606 for $UE_3$ in measurement period 602*a*. The spatial relationship between the two beams 606, 608, along with the requested beam change from both UEs, also indicates that the beam change request is not due to fading. The spatial relationship between the two beams along with the timing of the beam change requests together allow the base station to infer that the signal deterioration likely results from a blocker 650 (e.g. the UE requests are too coincidental to suggest that the signal deterioration is likely due to fading).

This blockage could be either a short disruption or a long disruption in service at the base station side. For example, the blockage may be due to a person walking/standing in a position that temporarily blocks the beam path of beams 606, 608. The blockage may have a longer duration, e.g., if the blockage is due to a vehicle that parks in the beam path.

At measurement period 602*e*, the best beam direction for $UE_2$ and $UE_3$ may remain the same as in the prior measurement period 602*d*. The continued use of the new beams 610, 612 may further indicate the possibility of a blocker, in connection with the timing of the beam change requests for two spatially close beams previously observed by the base station.

Once the gNB identifies $UE_2$ and $UE_3$ as possibly being blocked, the base station may perform a beam training procedure with $UE_2$ and $UE_3$ to verify whether the potential blockage is indeed a blockage event and rule out fading as the cause of signal deterioration. For example, the base station may perform a joint beam training for multiple UEs for which a shared potential blockage has been identified. In the example in FIG. 6, the joint training may be performed by $UE_2$ and $UE_3$ and may exclude $UE_1$. The base station may initiate joint beam training based on inferring that a collection of angles/beam directions appear to be blocked across multiple UEs.

Figure 7:
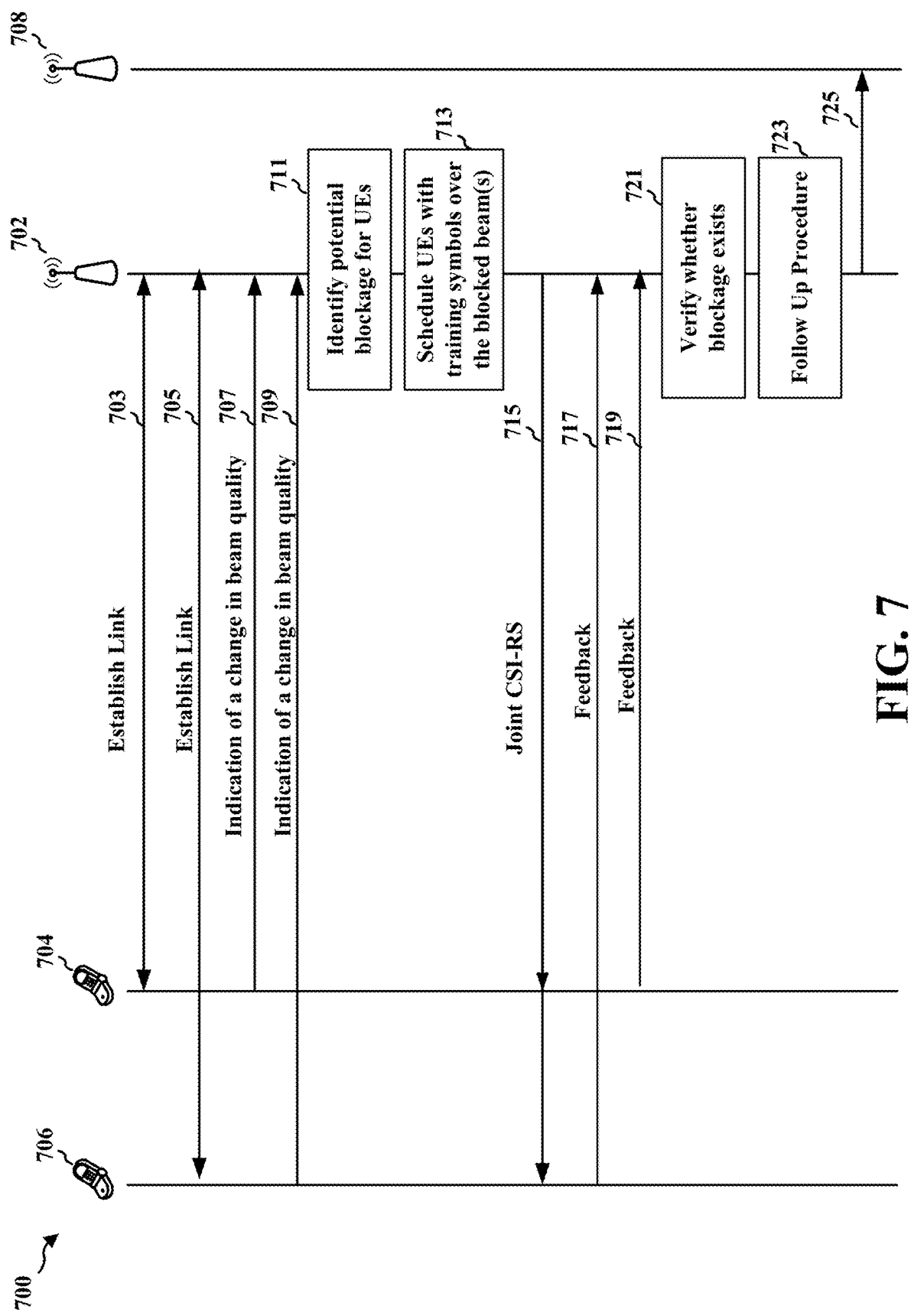
FIG. 7 illustrates an example communication flow between base stations and UEs.

FIG. 7 illustrates an example of communication 700 between a base station 702 and multiple UEs 704, 706 that may include such joint beam training. Base station 702 may correspond to base station 102, 180, 310, 402, 502, etc. The communication between base station 702 and UEs 704, 706 may comprise mmW communication. At 703, the base station may establish a link with UE 704. The UE and base station may perform a beam scanning procedure to select a beam(s) having a higher quality for communication between the UE 704 and base station. Similarly, at 705, the base station may establish a link with UE 706. The establishment of the link may include aspects of the beam scanning procedure described in connection with FIG. 4. The base station may then transmit/receive communication with the UEs 704, 706, based on their respective beams. The base station may also continue to receive beam information based on beam scans performed by the respective UEs 704, 706.

At 707, the base station may receive an indication from UE 704 of a change in the beam quality of the previously selected beam(s). At 709, the base station may receive an indication from UE 706 of a change in the beam quality of the previously selected beam(s). The indications may include a request to change beams, as described in connection with UE2 and $UE_3$ in FIG. 6. The indications may otherwise indicate a deterioration in a beam quality associated with a beam. For example, the indication may include an RSRP for a direction/angle/beam that is different than a prior RSRP for the direction/angle/beam.

At 711, the base station may identify a potential blockage for a set of UEs, including at least UE 704 and 706. The determination may include a determination that the set of UEs will be jointly served with a dedicated, joint beam training session. The determination at 711 may be made in any of a number of ways.

In one example, the determination of beams that are possibly blocked may be based on past beam index information accumulated by the base station, wherein a potential blockage is determined when a common (or correlated) deterioration in beam quality is detected for UEs or beams in a certain set of direction(s)/angle(s)/region. The beam quality deterioration may be based on a deterioration in RSRP for the direction(s)/angle(s)/region.

Figure 8:
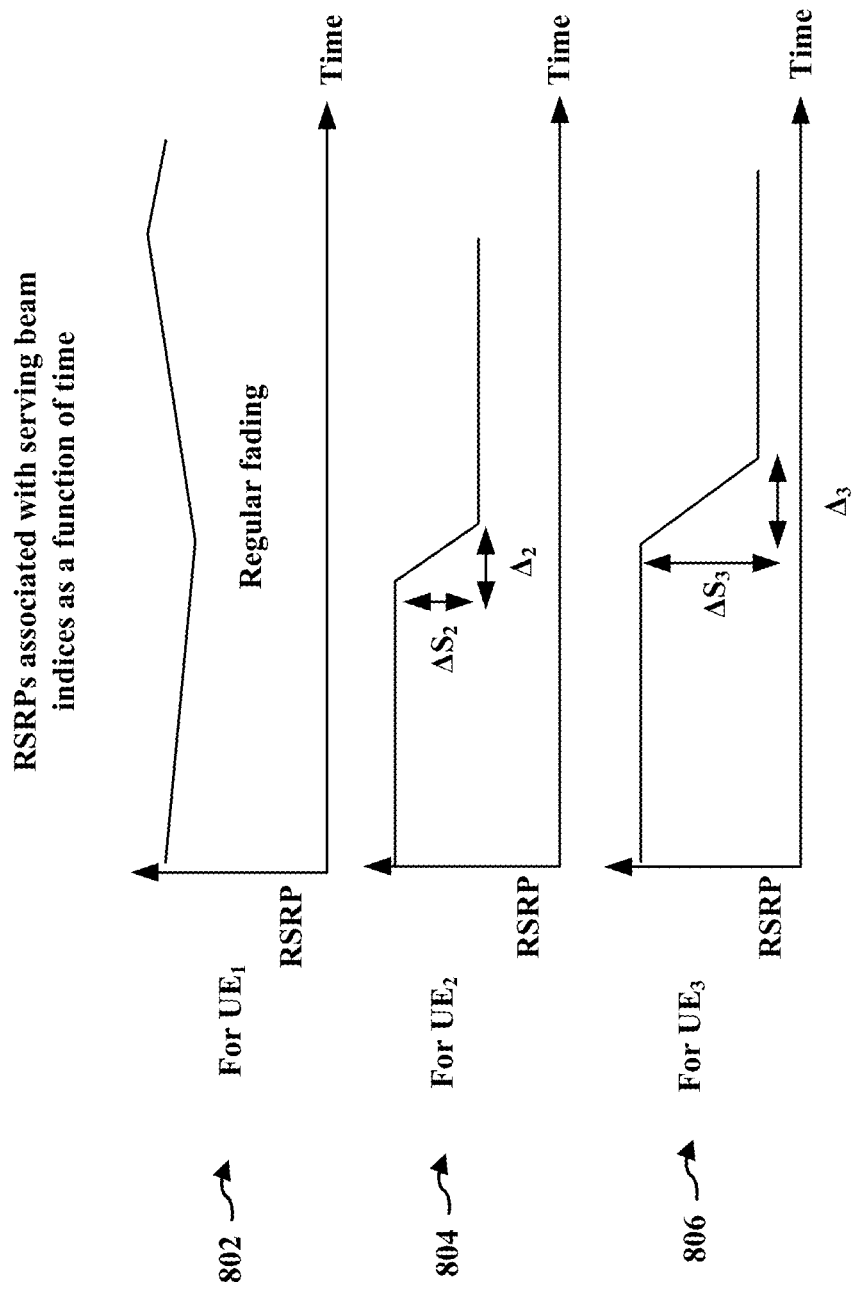
FIG. 8 illustrates examples of change in beam quality measurements over time.

A correlated deterioration may be associated with a beam index correlation, a time correlation metric $\Delta$ and an RSRP correlation metric $\Delta S$. The beam index correlation may indicate that the beams have a spatial relationship, e.g., are spatially close together so as to be jointly blocked. The time correlation metric $\Delta$ indicates that multiple UEs experienced the change in RSRP around the same time. The RSRP correlation metric $\Delta S$ indicates that multiple UEs experienced a similar deterioration in RSRP. FIG. 8 illustrates an example of a change in RSRP over time that may be reported by $UE_1$, $UE_2$, and $UE_3$ from FIG. 6 with respect to beams 604, 608, and 606, respectively. For $UE_1$, the RSRP measurement over time 802 of beam 604 changes slightly over time, but does not show a significant change in RSRP, e.g., $\Delta S$, to indicate a blocked beam. Instead, the change in RSRP over time in this example infers fading.

For $UE_2$, the RSRP measurement over time 804 of beam 608 includes a drop in RSRP, $\Delta S_2$, that occurs in time period $\Delta_2$. For $UE_3$, the RSRP measurement over time 806 of beam 606 includes a drop in RSRP, $\Delta S_3$, that occurs in time period $\Delta_3$. The base station may observe the change in RSRP for UE2 and UE3 and may determine whether the changes comprise a correlated deterioration that indicates a potential blockage of beams 606, 608. The base station may make the correlation determination using a threshold. For example, a correlated deterioration may be determined by the base station when a difference between the change in RSRP observed by $UE_2$ and $UE_3$ meets a first threshold and/or when a difference in the time periods over which the change was observed by $UE_2$ and $UE_3$ meets a second threshold. In one aspect, both thresholds may need to have been met in order for the base station to identify a need for joint beam training.

For example, the base station may identify a potential blockage of beam(s) based on a drop in RSRP of serving beams for at least two UEs when $|\Delta_i-\Delta_j|<\Delta_{threshold}$ and $|\Delta S_i-\Delta S_j|<\Delta S_{threshold}$ for all $i \neq j$. Thus, the base station may identify a potential blockage of beam(s) 606, 608 for $UE_2$ and $UE_3$ when $|\Delta_2-\Delta_3|<\Delta_{threshold}$ and $|\Delta S_2-\Delta S_3|<\Delta S_{threshold}$. An example $\Delta_{threshold}$ may be on the order of a hundred ms, or a few hundred ms, e.g., between 100 ms-400 ms. In one example, $\Delta_{threshold}$ may be 200 ms. An example $\Delta S_{threshold}$ may be on the order of a few dB, e.g., between 2-5 dB. In one example, $\Delta S_{threshold}$ may be 3 dB.

The identification of a potential blockage of serving beams for a set of UEs may also be determined based on a spatial association between the serving beam indices for the set of UEs having a correlated deterioration. As described in connection with FIG. 6, beams 606 and 608 have a spatial association, or are spatially related, because the beams 606, 608 are spatially close to each other. For example, adjacent/neighbor beams where the beams are arranged in terms of their spatial/angular relationship(s), overlapping beams in terms of spatial coverage, and/or beams whose peak direction(s) or centroidal coverage direction(s) are within a certain angular distance from each other may be determined to have a spatial association. In one example, the beams may be the same beam. Thus, two UEs having the same serving beam may indicate a correlated deterioration for the serving beam.

After identifying a potential blockage at 711 (for example, by determining a correlated deterioration with respect to the beams of UEs 704 and 706), at 713, the base station 702 may schedule all of the UEs identified in 711 with training symbols over the beams that are identified as potentially blocked. The training symbols may comprise a special, joint CSI-RS that is configured and transmitted jointly for the set of UEs identified at 711. While an SS is transmitted to all UEs served by a base station, a CSI-RS is typically UE specific for a single UE.

Thus, at 715, the base station may transmit a joint beam training signal, e.g., a joint CSI-RS, to the set of UEs identified at 711, including at least UE 704 and UE 706. The joint training signal may be transmitted, e.g., over each of the beams that are identified as potentially blocked.

At 717, the base station receives feedback from UE 706 based on the joint training signal transmitted at 715. At 719, the base station receives feedback from UE 704 based on the joint training signal transmitted at 715. The feedback 717, 719 may indicate a signal strength observed at the respective UEs for the joint training signal 715. The feedback may indicate the signal strength via any of any Reference Signal Received Power (RSRP), Received Signal Strength Indicator (RSSI), Reference Signal Received Quality (RSRQ), Signal to Interference and Noise Ratio (SINR), Signal to Noise Ratio (SNR), etc. observed at the respective UEs for the joint training signal 715.

At 721, the base station 702 may use the feedback 717, 719 based on the joint beam training signal 715 to determine whether a blockage of the beam direction(s) identified at 711 does in fact exist. If the base station determines at 721 that the beams are not blocked, or that the blocker has moved and no longer blocks the beam, the base station may continue its communication with the UEs 704, 706. However, if the base station determines that the feedback 717, 719 indicates that a blockage does exist, the base station may perform a follow-up procedure at 723 to address the blockage.

In one example of a follow up procedure, the base station may adjust the performance of a beam scanning procedure or a beam training procedure to restrict beam scanning/beam training to an unblocked set of spatial angles, e.g., to spatial angles other than those associated with the beams verified at 721. Thus, the base station may refrain from performing a beam scanning procedure or a beam training procedure over the blocked beams verified at 721. For example, the base station may only perform P-1 or P-2 beam training over the unblocked set of spatial angles. Whereas beam training may be used to identify beams for beam refinement or narrowing the selection of beams to be used for communication, in this example, the base station may use the joint training feedback to null out, refrain from using or blank out using certain beam(s)/direction(s) in subsequent training.

In a second example of a follow up procedure, the base station may adjust the frequency of beam scanning. For example, the base station may increase a frequency of beam scanning over the unblocked set of spatial angles and/or the base station may decrease a frequency of beam scanning over the blocked set of spatial angles. The change in frequency may apply to CSI-RS and/or synchronization signal block (SSB) beam scanning. By decreasing the frequency of beam scanning over the blocked spatial angles, the procedure enables the base station to detect when a blocker moves and the spatial angles are no longer blocked, while still reducing the signaling, time, and battery power required to beam scan over the blocked spatial angles.

Figure 9:
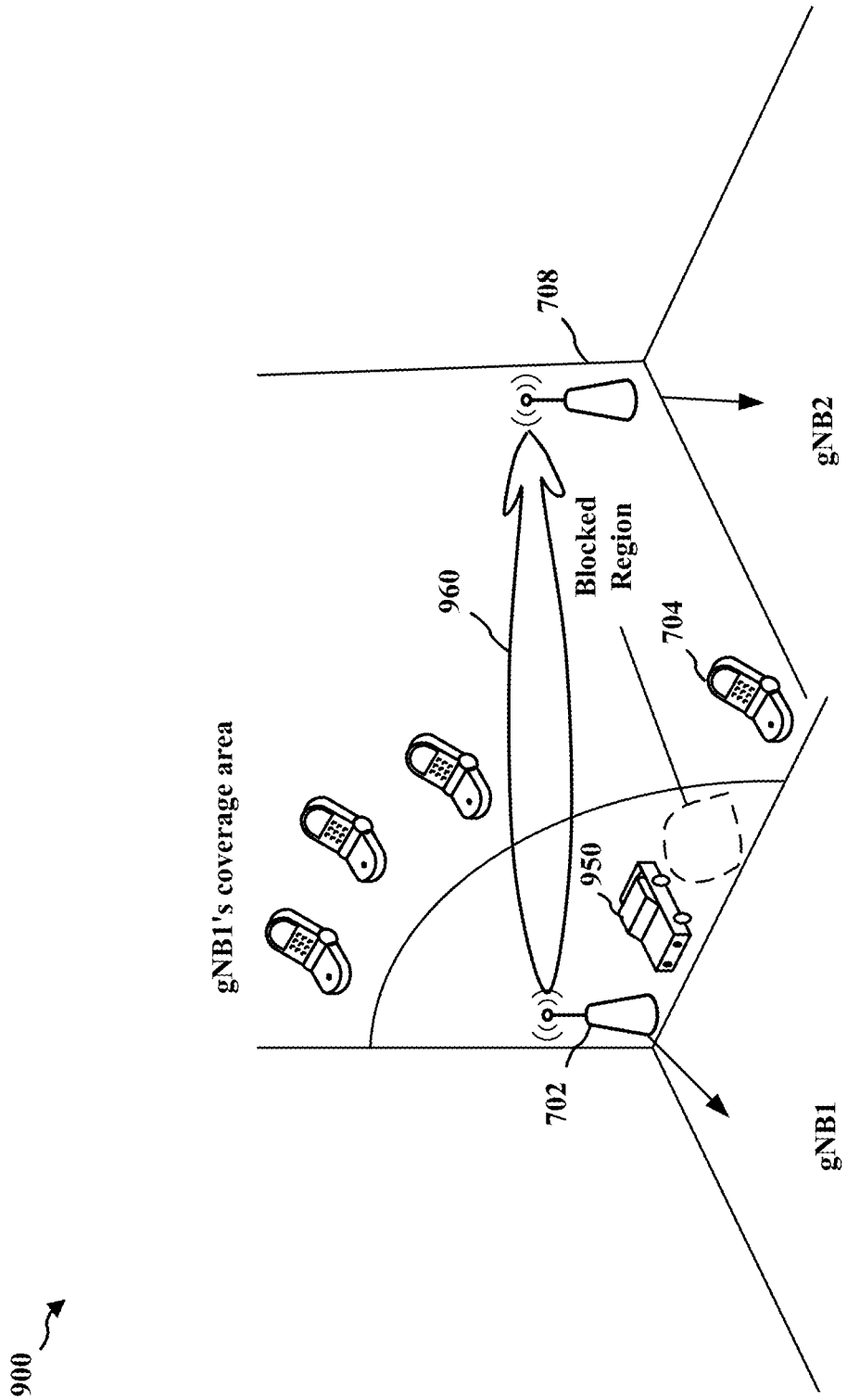
FIG. 9 illustrates an example of coordination among base stations based on the determination of a blocked angle/beam/direction/region.

In a third example of a follow up procedure, the base station 702 may coordinate with at least one neighbor base station 708, at 725. The base station 702 can coordinate with its neighbor base station(s) 708 to scan a certain spatial region with a higher frequency and/or to provide targeted coverage from the neighbor base station for a certain UE. FIG. 9 illustrates an example 900 in which base station 702 coordinates with neighbor base station 708 based on determining a blocked region/angle/beam for UE 704. The blockage may be a temporary blockage caused by a mobile blocker, e.g., 950. In one aspect, base station 702 may coordinate with neighbor base station 708 via a backhaul 960 (e.g. a mmW backhaul or a sub-6 GHz backhaul).

Base station 702 can inform base station 708 regarding the angles/region/direction that are blocked for the base station's 702 communication with at least one UE 704. Base station 708 may correlate that information from base station 702 to determine corresponding angles that base station 708 can cover in lieu of, or to compensate for, the blocked angles/region/direction at base station 702.

In one example, for an active UE served by base station 702 that is blocked in a particular beam/angle/direction/region from serving base station 702, the serving base station 702 may indicate to base station 708 a choice of beam for CSI-RS training to the blocked UE.

In one example, for an active UE served by base station 702 that is in a possible handover situation to base station 708 and that is blocked in a particular beam/angle/direction/region from serving base station 702, the serving base station 702 may send an indication that leads to base station 708 increasing the frequency of scanning in a region at base station 708 that corresponds to/complements the coverage of the blocked region for base station 702.

For an inactive UE or an unknown UE in the coverage region between base station 702 and base station 708, base station 702 may send an indication that leads to base station 708 increasing a scanning frequency in a region at base station 708 that corresponds to/complements the coverage of the blocked region for base station 702. The increase may be performed at the base station's 708 discretion. The indication from base station 702 may indicate that the increase may be performed at the base station's 708 discretion.

Figure 10:
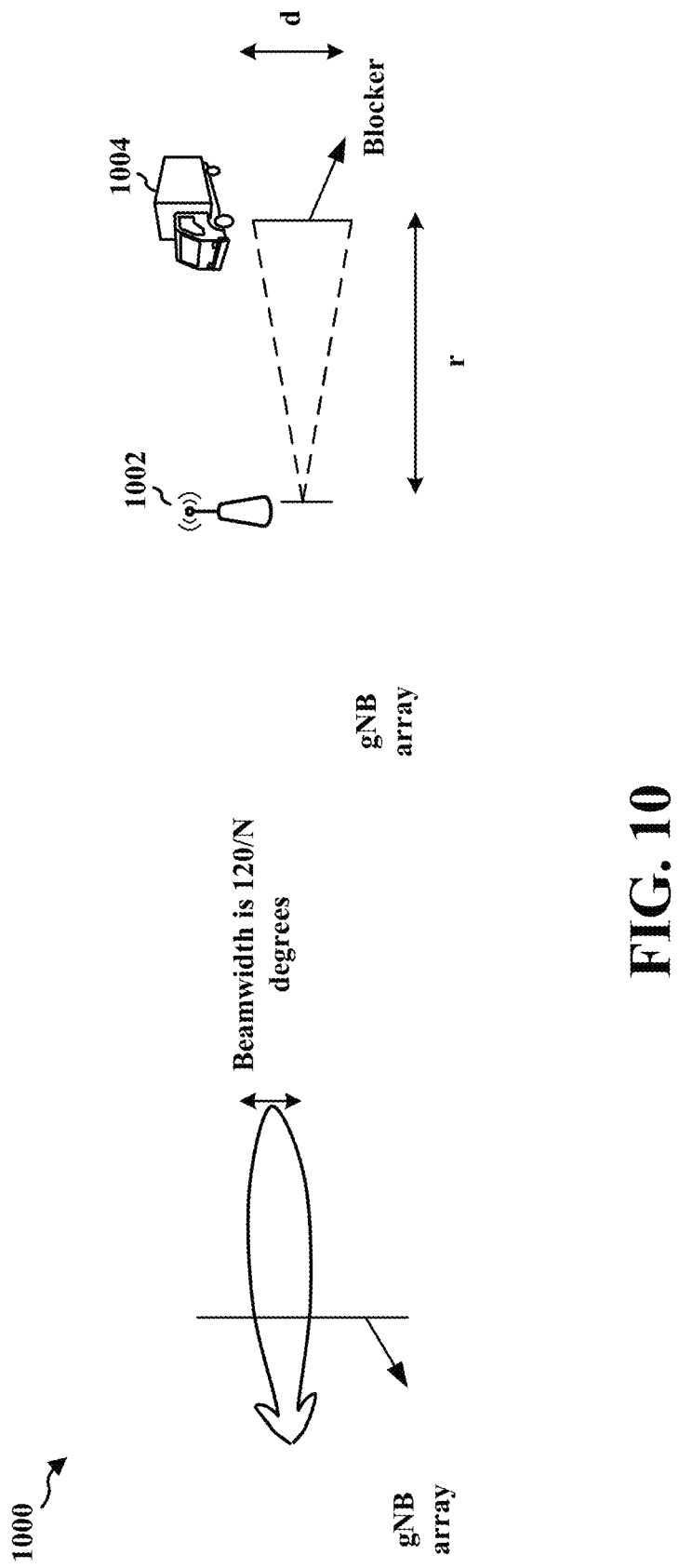
FIG. 10 illustrates a relationship between a blocked beamwidth and a size and location of a blocker.

FIG. 10 illustrates an example 1000 of communication from a base station that is blocked by a blocker. Beamwidth in a certain dimension at the base station side can be approximated in degrees as 120/N where N is the number of antennas in a certain dimension. Thus, with 64 antenna linear array, the beamwidth is approximately 2 degrees in that dimension. With 16 antennas, the beamwidth is approximately 7-8 degrees. For a blocker 1004 of width d meters at a distance of r meters away from the base station 1002, the blocked angle is given as $2 \tan^{-1}(d/2r)$. When d=1 m and r=10 m, the blocked angle is approximately 5.7 degrees. When d=1 m and r=2.5 m, the blocked angle is approximately 22.7 degrees. When d=1 m and r=1 m, the blocked angle is approximately 53.1 degrees. As shown in these examples, when the blocker 1004 is close to the base station 1002, it may be very difficult for the base station to avoid the blocker with a simple beam refinement protocol (e.g., using beams overlapped over a P-1 codebook). Therefore, the base station 1002 may need to perform a more proactive or sophisticated blocker avoidance protocol in order to address the presence of blocker 1004. The examples described in connection with the follow up procedure 723, including the possibility of coordinating with a neighbor base station, provides a way for the base station to handle blocked regions.

Figure 11:
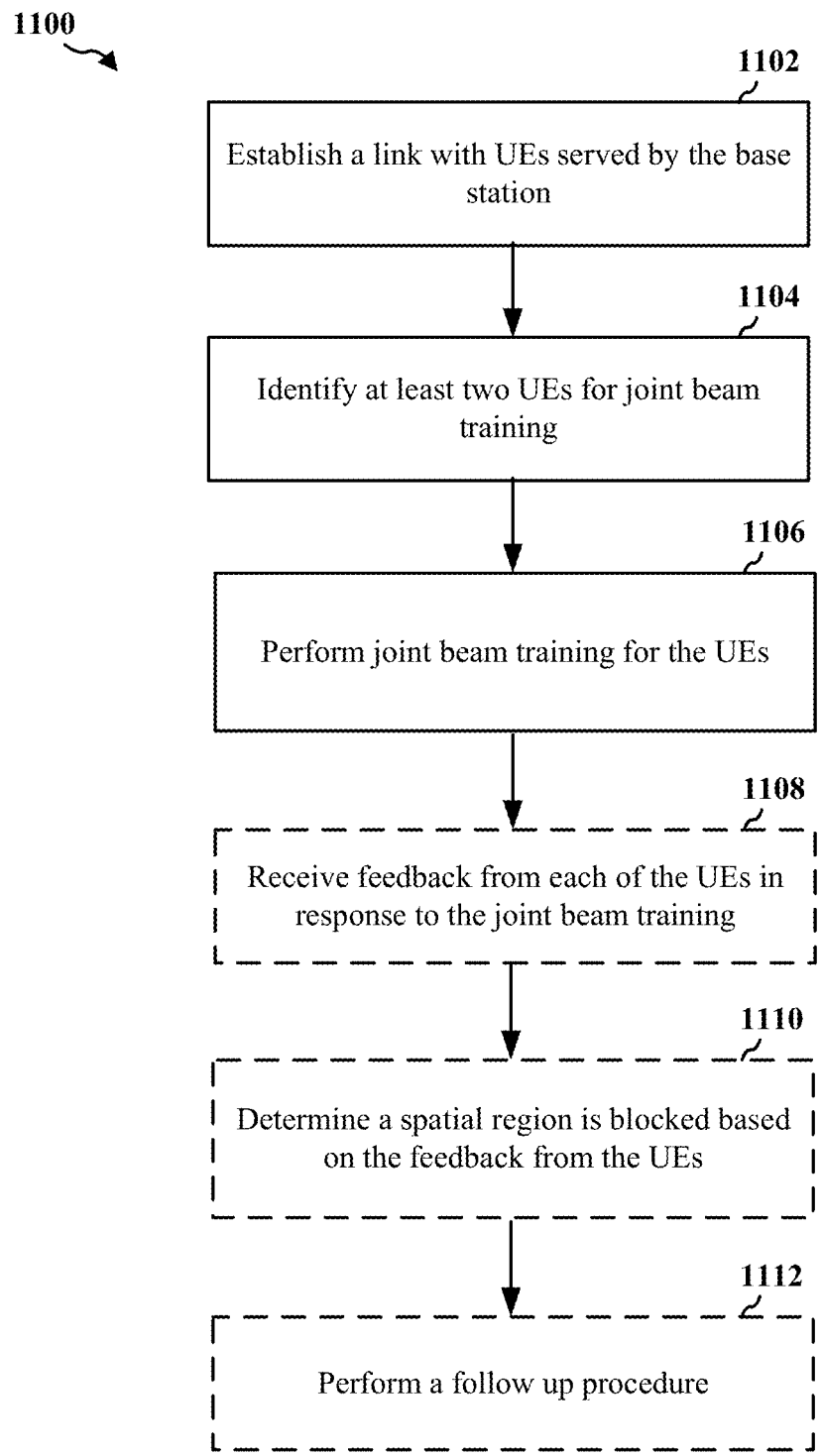
FIG. 11 is a flowchart of a method of wireless communication.

FIG. 11 is a flowchart 1100 of a method of wireless communication. The method may be performed by a base station (e.g., the base station 102, 180, 310, 402, 502, 702, 1002; the apparatus 1202/1202'; the processing system 1314, which may include the memory 376 and which may be the entire base station 102, 180, 310, 402, 502, 702, 1002 or a component of the base station 102, 180, 310, 402, 502, 702, 1002, such as the TX processor 316, the RX processor 370, and/or the controller/processor 375) communicating with UEs 1250 (e.g., UE 104, 350, 404, 504, 704, 706). The communication may comprise mmW communication, as described in connection with FIG. 4. Optional aspects are illustrated in dashed lines. The method allows a base station to determine a dynamically blocked spatial region and perform a follow up procedure to handle the blockage.

At 1102, the base station establishes a link with a plurality of UEs served by the base station. The establishment of the link may include an initial beam acquisition procedure, e.g., as described in connection with FIG. 4. Then, the base station may continue to receive beam scanning information from the served UEs. For example, referring to FIG. 7, at 703, the base station 702 may establish a link with UE 704. Similarly, at 705, the base station 702 may establish a link with UE 706. The base station 702 may then transmit/receive communication with the UEs 704, 706, based on their respective beams (e.g. beams 608 and 606 in FIG. 6).

At 1104, the base station identifies at least two UEs from among the plurality of UEs for joint beam training, wherein the identification is based on a potential block of at least one serving beam for the at least two UEs. The at least two UEs may be identified based on past beam index information and corresponding signal strengths received from the plurality of UEs served by the base station. The signal strengths are indicated by at least one of an RSRP, RSSI, RSRQ, SINR, SNR, etc. The at least two UEs may be identified based on a correlated deterioration of past signal strengths for the at least two UEs over time. The correlated deterioration may be determined based on at least one of a beam relationship metric (e.g. spatial relationship or spatial association), a time metric (e.g. Δ), or a signal strength correlation metric (e.g. ΔS). For example, the base station may identify a potential blockage of beam(s) based on a drop in RSRP of serving beams for at least two UEs (denoted i, j, . . . up to a number of UEs) where $|\Delta_i - \Delta_j| < \Delta_{threshold}$ and $|\Delta S_i - \Delta_j| < \Delta S_{threshold}$ for all i≠j. For example, referring to FIG. 7, at 711, the base station 702 may identify a potential blockage for a set of UEs, including at least UE 704 and 706. In one example, the determination of beams that are possibly blocked may be based on past beam index information accumulated by the base station, wherein a potential blockage is determined when a correlated deterioration in beam quality is detected for UEs or beams in a certain set of direction(s)/angle(s)/region. For instance, the base station may identify a potential blockage of beam(s) 606, 608 (corresponding to the past beam index information) for $UE_2$ and $UE_3$ when $|\Delta_2 - \Delta_3| < \Delta_{threshold}$ and $|\Delta S_2 - \Delta S_3| < \Delta S_{threshold}$ based on a drop in RSRP over time of serving beams (corresponding to the correlated deterioration in beam quality) for UEs 704 and 706 as illustrated in FIG. 8. The identification of a potential blockage of serving beams for a set of UEs may also be determined based on a spatial association between the serving beam indices for the set of UEs having a correlated deterioration, for example, the spatial association of beams 606 and 608 described in connection with FIG. 6.

At 1106, the base station performs joint beam training for the at least two UEs. The joint beam training may comprise scheduling each UE for which the potential block is determined with at least one training symbol over the at least one serving beam that is potentially blocked. The training symbol may be transmitted in a joint CSI-RS for the at least two UEs. For example, referring to FIG. 7, after identifying a potential blockage at 711, at 713, the base station 702 may schedule all of the UEs identified in 711 (and at 1104) with training symbols over the beams that are identified as potentially blocked. The training symbols may comprise a special, joint CSI-RS that is configured and transmitted jointly for the set of UEs identified at 711. Thus, at 715, the base station may transmit a joint beam training signal, e.g., a joint CSI-RS, to the set of UEs identified at 711, including at least UE 704 and UE 706. The joint training signal may be transmitted, e.g., over each of the beams that are identified as potentially blocked.

At 1108, the base station may receive feedback from each of the at least two UEs in response to the joint beam training. For example, referring to FIG. 7, at 717, the base station receives feedback from UE 706 based on the joint training signal transmitted at 715. At 719, the base station receives feedback from UE 704 based on the joint training signal transmitted at 715. The feedback 717, 719 may indicate a signal strength (for example, RSRP) observed at the respective UEs for the joint training signal 715.

Then, at 1110, the base station may determine a spatial region that is blocked based on the feedback received from the at least two UEs. The blocked region may be dynamically blocked. For example, referring to FIG. 7, at 721, the base station 702 may use the feedback 717, 719 based on the joint beam training signal 715 to determine whether a blockage of the beam direction(s) identified at 711 does in fact exist.

The base station may then take action based on its awareness of the blocked region. At 1112, the base station may perform a follow up procedure in response to determining the spatial region is blocked. For example, referring to FIG. 7, if the base station determines that the feedback 717, 719 indicates that a blockage does exist, the base station may perform a follow-up procedure at 723 to address the blockage.

In one aspect, the follow up procedure may include restricting beam training to unblocked spatial angles determined from the feedback. Thus, the base station may perform beam training only over unblocked spatial angles. For example, referring to FIG. 7, the base station may adjust the performance of a beam scanning procedure or a beam training procedure to restrict beam scanning/beam training to an unblocked set of spatial angles, e.g., to spatial angles other than those associated with the beams verified at 721 (e.g. corresponding to beams 606 and 608 in FIG. 6). Thus, the base station may refrain from performing a beam scanning procedure or a beam training procedure over the blocked beams verified at 721. For example, the base station may only perform P-1 or P-2 beam training over the unblocked set of spatial angles (e.g. corresponding to beams 610 and 612 in FIG. 6).

In another aspect, the follow up procedure may include adjusting a frequency for beam scanning for at least one region. For example, the follow up procedure may include increasing a beam scanning frequency over a set of unblocked spatial angles determined from the feedback. Alternatively or additionally, the follow up procedure may include decreasing a beam scanning frequency over a set of blocked spatial angles determined from the feedback. In one example, the base station may increase the beam scanning frequency of the unblocked spatial angles and may also decrease the beam scanning frequency over the blocked spatial angles. For example, referring to FIG. 7, the base station 702 may increase a frequency of beam scanning over the unblocked set of spatial angles of UEs 704 and 706 (e.g. corresponding to beams 610 and 612 in FIG. 6) and/or the base station 702 may decrease a frequency of beam scanning over the blocked set of spatial angles (e.g. corresponding to beams 606 and 608 in FIG. 6). The change in frequency may apply to CSI-RS and/or synchronization signal block (SSB) beam scanning.

In a further aspect, the follow up procedure may include coordinating with at least one neighbor base station, e.g., as described in connection with FIG. 9. For example, referring to FIG. 7, base station 702 may coordinate with at least one neighbor base station 708, at 725, to scan a certain spatial region with a higher frequency and/or to provide targeted coverage from the neighbor base station for a certain UE. Base station 702 can inform base station 708 regarding the angles/region/direction that are blocked for the base station's 702 communication with at least one UE 704 (e.g. by blocker 950 in FIG. 9). Base station 708 may correlate that information from base station 702 to determine corresponding angles that base station 708 can cover in lieu of, or to compensate for, the blocked angles/region/direction at base station 702.

In one example of this aspect, coordinating with the at least one neighbor base station may include indicating to the at least one neighbor base station to increase a beam scanning frequency over a set of angles. For instance, referring to FIGS. 7 and 9, for an active UE (e.g. UE 704) served by base station 702 that is in a possible handover situation to base station 708 and that is blocked in a particular beam/angle/direction/region from serving base station 702 (e.g. by blocker 950), the serving base station 702 may send an indication that leads to base station 708 increasing the frequency of scanning in a region at base station 708 that corresponds to/complements the coverage of the blocked region for base station 702. In another example, for an inactive UE or an unknown UE in the coverage region between base station 702 and base station 708, base station 702 may similarly send an indication that leads to base station 708 increasing a scanning frequency in a region at base station 708 that corresponds to/complements the coverage of the blocked region for base station 702. For inactive or unknown UEs (and in some aspects for active UEs), the indication from base station 702 may indicate that the increase may be performed at the base station's 708 discretion.

In another example of this aspect, coordinating with the at least one neighbor base station may include indicating to the at least one neighbor base station to decrease a beam scanning frequency over a set of angles. For instance, referring to FIGS. 7 and 9, if the active UE (e.g. UE 704) served by base station 702 is no longer blocked in a particular beam/angle/direction/region from serving base station 702 (e.g. blocker 950 has moved away), the serving base station 702 may send an indication that leads to base station 708 decreasing the frequency of scanning in a region at base station 708 that corresponds to/complements the coverage of the now, unblocked region for base station 702.

In a further example of this aspect, coordinating with the at least one neighbor base station may include indicating to the at least one neighbor base station a choice of beam for beam training for a blocked UE, e.g., for CSI-RS or beam training between the UE and the neighbor base station(s). In one example, referring to FIGS. 7 and 9, for an active UE (e.g. UE 704) served by base station 702 that is blocked in a particular beam/angle/direction/region from serving base station 702 (e.g. by blocker 950), the serving base station 702 may indicate to base station 708 a choice of beam for CSI-RS training to the blocked UE.

In another example of this aspect, the coordination with the at least one neighbor base station may be performed via a backhaul. For example, the backhaul may comprise a mmW backhaul. In another example, the backhaul may comprise a sub-6 backhaul. For example, referring to FIG. 9, base station 702 may coordinate with neighbor base station 708 as previously described via a backhaul 960 (e.g. a mmW backhaul or a sub-6 GHz backhaul).

Figure 12:
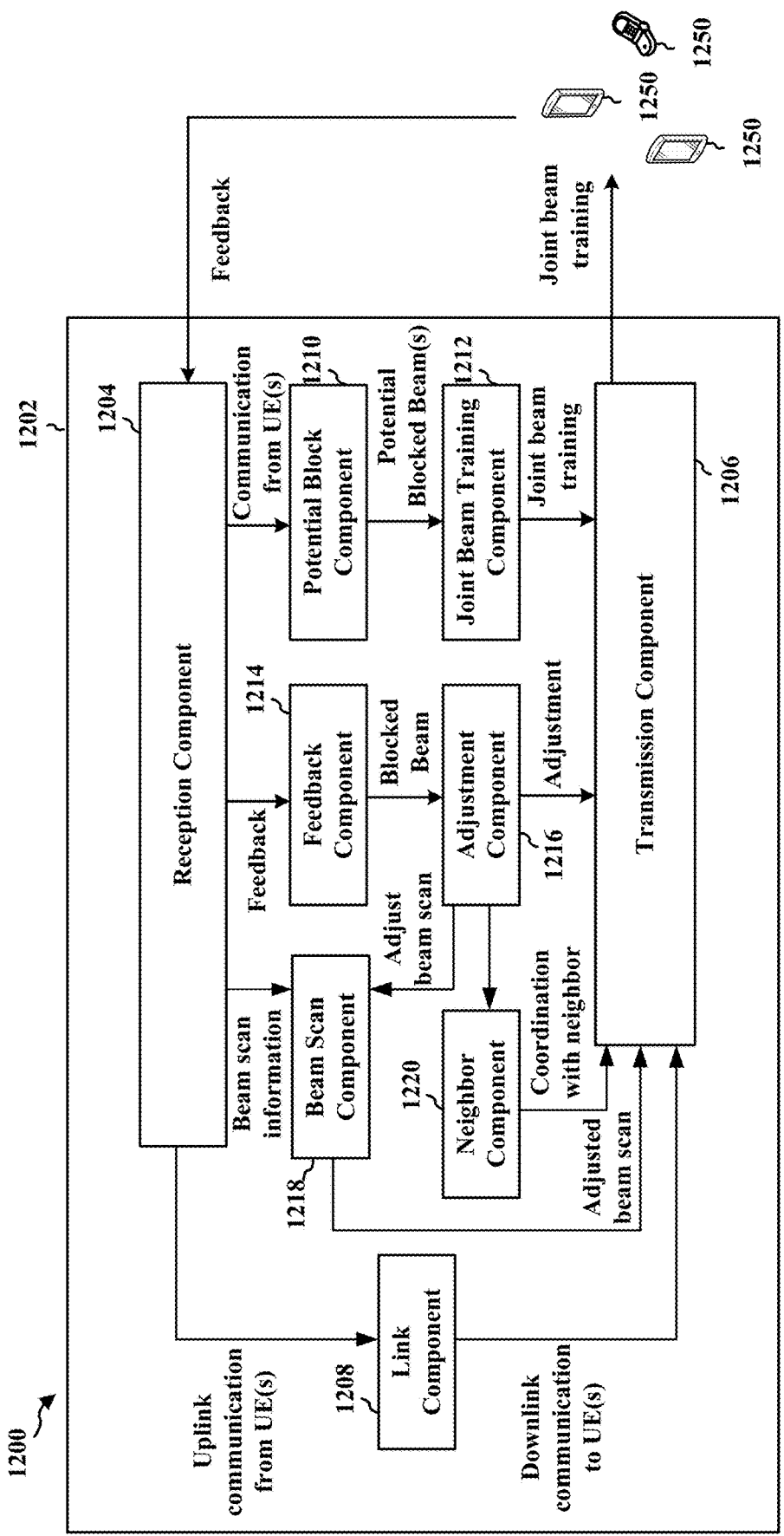
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a base station (e.g., the base station 102, 180, 310, 402, 502, 702, 1002) communicating with UEs 1250 (e.g., UE 104, 350, 404, 504, 704, 706). The communication may comprise mmW communication, as described in connection with FIG. 4. The apparatus includes a reception component 1204 that receives uplink communication from UEs 1250 and a transmission component 1206 that transmits downlink communication to UEs 1250.

Link component 1208 is configured to establish a link with a plurality of UEs served by the base station. The apparatus 1202 may include a potential block component 1210 configured to identify at least two UEs from among the plurality of UEs for joint beam training. The apparatus may include a joint beam training component 1212 configured to perform joint beam training for the at least two UEs, e.g., via transmission component 1206. The apparatus may include a feedback component 1214 configured to receive feedback from each of the at least two UEs, e.g., via reception component 1204, in response to the joint beam training. The feedback component 1214 may be configured to determine a spatial region that is blocked based on the feedback received from the at least two UEs. The apparatus may include an adjustment component 1216 configured to perform a follow up procedure in response to determining the spatial region is blocked. For example, the adjustment component 1216 may adjust a frequency and/or beams for beam scanning a particular direction, e.g., via beam scan component 1218. The adjustment component 1216 may coordinate with at least one neighbor base station, e.g., via neighbor component 1220.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
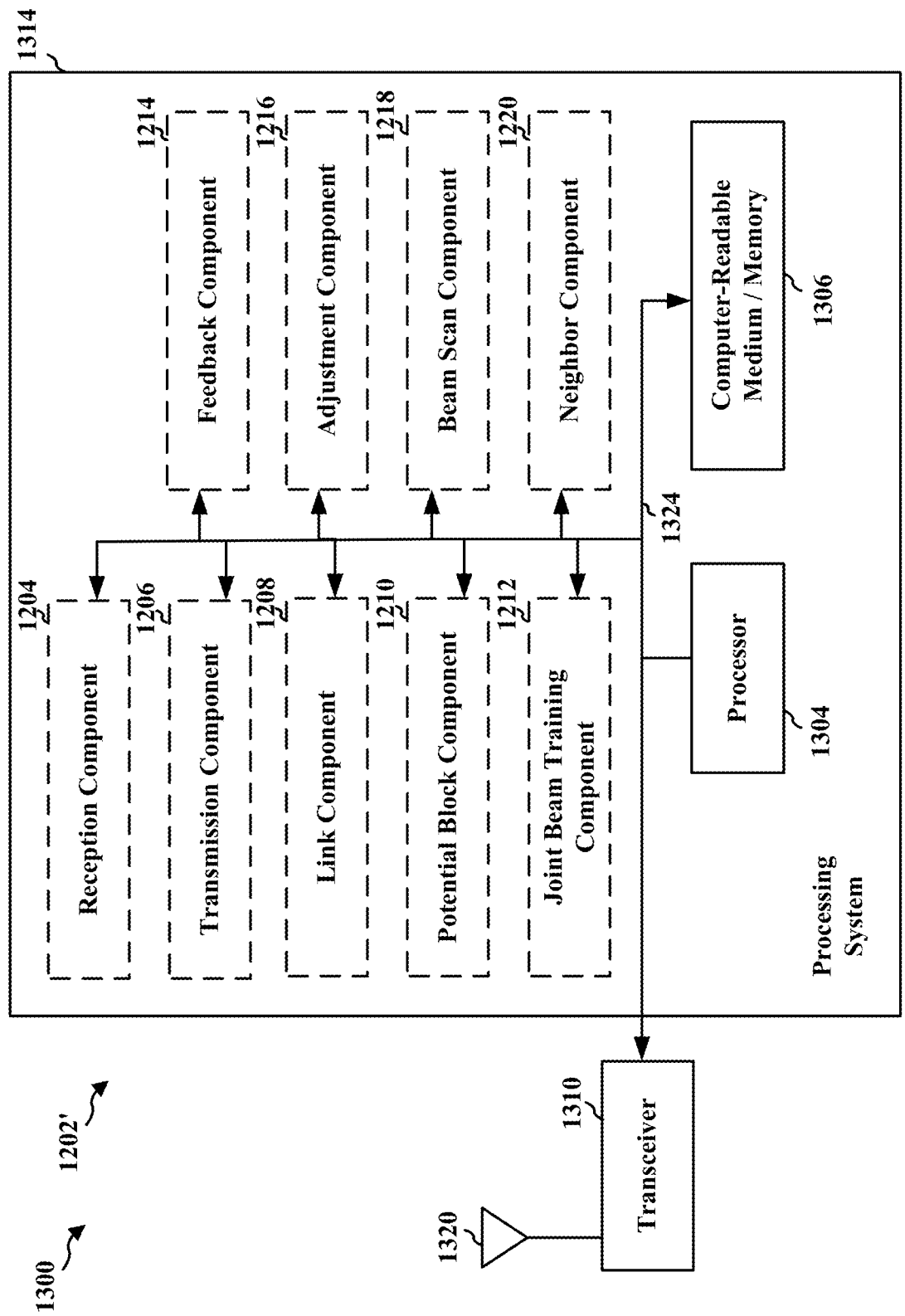
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for establishing a link with a plurality of UEs served by the base station, means for identifying at least two UEs from among the plurality of UEs for joint beam training, means for performing joint beam training for the at least two UEs, means for receiving feedback from each of the at least two UEs in response to the joint beam training, means for determining a spatial region that is blocked based on the feedback received from the at least two UEs, and means for performing a follow up procedure in response to determining the spatial region is blocked. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples illustrate example embodiments. These embodiments and aspects of these embodiments may be used in combination with any previous embodiments or aspects of the previous embodiments disclosed or discussed in relation to the systems, methods, or devices of the figures.

Example 1 is a method of wireless communication at a base station that includes establishing a link with a plurality of UEs served by the base station, identifying at least two UEs from among the plurality of UEs for joint beam training, wherein the identification is based on a potential block of at least one serving beam for the at least two UEs; and performing the joint beam training for the at least two UEs.

In Example 2, the performing joint beam training of example 1 includes scheduling each UE for which the potential block is determined with at least one training symbol over the at least one serving beam that is potentially blocked.

In Example 3, the method of any of examples 1-2 further includes the at least one training symbol being transmitted in a joint CSI-RS for the at least two UEs.

In Example 4, the method of any of examples 1-3 may include the at least two UEs being identified based on past beam index information and corresponding signal strengths received from the plurality of UEs served by the base station.

In Example 5, the method of any of examples 1-4 may include the signal strengths being indicated by at least one of a Reference signal received power (RSRP), a Received signal strength indicator (RSSI), a Reference Signal Received Quality (RSRQ), a Signal to Interference and Noise Ratio (SINR), or a Signal to Noise Ratio (SNR).

In Example 6, the method of any of examples 1-5 may include the at least two UEs being identified based on a correlated deterioration of past signal strengths for the at least two UEs over time.

In Example 7, the method of any of examples 1-6 may include the correlated deterioration being determined based on at least one of a beam relationship metric, a time metric, or a signal strength correlation metric.

In Example 8, the method of any of examples 1-7 may include receiving feedback from each of the at least two UEs in response to the joint beam training.

In Example 9, the method of any of examples 1-8 may include determining a spatial region that is blocked based on the feedback received from the at least two UEs.

In Example 10, the method of any of examples 1-9 may include performing a follow up procedure in response to determining the spatial region is blocked.

In Example 11, the method of any of examples 1-10 may include the follow up procedure comprising restricting beam training to unblocked spatial angles determined from the feedback.

In Example 12, the method of any of examples 1-11 may include the follow up procedure comprising increasing a beam scanning frequency over a set of unblocked spatial angles determined from the feedback.

In Example 13, the method of any of examples 1-12 may include the follow up procedure comprising decreasing a beam scanning frequency over a set of blocked spatial angles determined from the feedback.

In Example 14, the method of any of examples 1-13 may include the follow up procedure comprising coordinating with at least one neighbor base station.

In Example 15, the method of any of examples 1-14 may include coordinating with the at least one neighbor base station comprising indicating to the at least one neighbor base station to increase a beam scanning frequency over a set of angles.

In Example 16, the method of any of examples 1-15 may include coordinating with the at least one neighbor base station comprising indicating to the at least one neighbor base station to decrease a beam scanning frequency over a set of angles.

In Example 17, the method of any of examples 1-16 may include coordinating with the at least one neighbor base station comprising indicating to the at least one neighbor base station a choice of beam for beam training for a blocked UE.

In Example 18, the method of any of examples 1-17 may include coordination with the at least one neighbor base station being performed via a backhaul.

Example 19 is a system or apparatus including means for implementing a method or realizing an apparatus as in any of examples 1-18.

Example 20 is a non-transitory computer readable medium storing instructions executable by one or more processors to cause the one or more processors to implement a method as in any of examples 1-18.

Example 21 is a system including one or more processors and memory in electronic communication with the one or more processors storing instructions executable by the one or more processors to cause the system or apparatus to implement a method as in any of examples 1-18.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   establishing a link with a plurality of user equipment (UEs) served by the base station;
   identifying at least two UEs from among the plurality of UEs for joint beam training, wherein the identification is based on a potential blockage of at least one serving beam for the at least two UEs, and wherein the identification is based on a correlated deterioration of beam quality for the at least two UEs; and
   performing joint beam training for the at least two UEs based on the identifying.

2. The method of claim 1, wherein performing joint beam training comprises scheduling each UE for which the potential blockage is determined with at least one training symbol over the at least one serving beam that is potentially blocked.

3. The method of claim 2, wherein the at least one training symbol is transmitted in a joint channel state information reference signal (CSI-RS) for the at least two UEs.

4. The method of claim 1, wherein the at least two UEs are identified based on past beam index information and corresponding signal strengths received from the plurality of UEs served by the base station.

5. The method of claim 4, wherein the signal strengths are indicated by at least one of a Reference Signal Received Power (RSRP), a Received Signal Strength Indicator (RSSI), a Reference Signal Received Quality (RSRQ), a Signal to Interference and Noise Ratio (SINR), or a Signal to Noise Ratio (SNR).

6. The method of claim 1, wherein the at least two UEs are identified based on a correlated deterioration of past signal strengths for the at least two UEs over time.

7. The method of claim 6, wherein the correlated deterioration is determined based on at least one of a beam relationship metric, a time metric, or a signal strength correlation metric.

8. The method of claim 1, further comprising:
   receiving feedback from each of the at least two UEs in response to the joint beam training.

9. The method of claim 8, further comprising:
   determining a spatial region that is blocked based on the feedback received from the at least two UEs.

10. The method of claim 9, further comprising:
    performing a follow up procedure in response to determining the spatial region is blocked.

11. The method of claim 10, wherein the follow up procedure comprises restricting beam training to unblocked spatial angles determined from the feedback.

12. The method of claim 10, wherein the follow up procedure comprises increasing a beam scanning frequency over a set of unblocked spatial angles determined from the feedback.

13. The method of claim 10, wherein the follow up procedure comprises decreasing a beam scanning frequency over a set of blocked spatial angles determined from the feedback.

14. The method of claim 10, wherein the follow up procedure comprises coordinating with at least one neighbor base station.

15. The method of claim 14, wherein coordinating with the at least one neighbor base station comprises indicating to the at least one neighbor base station to increase a beam scanning frequency over a set of angles.

16. The method of claim 14, wherein coordinating with the at least one neighbor base station comprises indicating to the at least one neighbor base station to decrease a beam scanning frequency over a set of angles.

17. The method of claim 14, wherein coordinating with the at least one neighbor base station comprises indicating to the at least one neighbor base station a choice of beam for beam training for a blocked UE.

18. The method of claim 14, wherein coordination with the at least one neighbor base station is performed via a backhaul.

19. An apparatus for wireless communication at a base station, comprising:
    means for establishing a link with a plurality of user equipment (UEs) served by the base station;
    means for identifying at least two UEs from among the plurality of UEs for joint beam training, wherein the identification is based on a potential blockage of at least one serving beam for the at least two UEs, and wherein the identification is based on a correlated deterioration of beam quality for the at least two UEs; and
    means for performing joint beam training for the at least two UEs based on the identifying.

20. The apparatus of claim 19, further comprising:
    means for receiving feedback from each of the at least two UEs in response to the joint beam training.

21. The apparatus of claim 20, further comprising:
    means for determining a spatial region that is blocked based on the feedback received from the at least two UEs.

22. The apparatus of claim 21, further comprising:
    means for performing a follow up procedure in response to determining the spatial region is blocked.

23. An apparatus for wireless communication at a base station, comprising:
    a memory; and
    at least one processor coupled to the memory and configured to:
    establish a link with a plurality of user equipment (UEs) served by the base station;
    identify at least two UEs from among the plurality of UEs for joint beam training, wherein the identification is based on a potential blockage of at least one serving beam for the at least two UEs, and wherein the identification is based on a correlated deterioration of beam quality for the at least two UEs; and
    perform joint beam training for the at least two UEs based on the identifying.

24. The apparatus of claim 23, wherein the at least one processor is further configured to:
    receive feedback from each of the at least two UEs in response to the joint beam training.

25. The apparatus of claim 24, wherein the at least one processor is further configured to:
    determine a spatial region that is blocked based on the feedback received from the at least two UEs.

26. The apparatus of claim 25, wherein the at least one processor is further configured to:
    perform a follow up procedure in response to determining the spatial region is blocked.

27. A non-transitory computer-readable medium storing computer executable code for wireless communication at a base station, comprising code to:
    establish a link with a plurality of user equipment (UEs) served by the base station;
    identify at least two UEs from among the plurality of UEs for joint beam training, wherein the identification is based on a potential blockage of at least one serving beam for the at least two UEs, and wherein the identification is based on a correlated deterioration of beam quality for the at least two UEs; and perform joint beam training for the at least two UEs based on the identifying.

28. The computer-readable medium of claim 27, further comprising code to:

receive feedback from each of the at least two UEs in response to the joint beam training.

29. The computer-readable medium of claim 28, further comprising code to:

determine a spatial region that is blocked based on the feedback received from the at least two UEs.

30. The computer-readable medium of claim 29, further comprising code to:

perform a follow up procedure in response to determining the spatial region is blocked.

* * * * *